3,280,212
CONVERSION OF HYDROCARBONS
Joseph N. Miale, Trenton, N.J., and Paul B. Weisz, Media, Pa., assignors to Mobil Oil Corporation, a corporation of New York
No Drawing. Filed Aug. 18, 1964, Ser. No. 390,454
20 Claims. (Cl. 260—683.65)

This invention relates to the catalytic conversion of hydrocarbons and, in particular, to a process for converting certain classes of hydrocarbons in the presence of unique solid oxide catalysts, together with activator substances, in the hydrocarbon charge stream.

This invention contemplates a process for the conversion of hydrocarbons in which a hydrocarbon charge is reacted under conversion conditions in the presence of an acidic solid oxide catalyst and an activator substance that serves to improve the activity of the oxide catalyst for a desired conversion. In particular, this invention is directed to the process for effecting conversions of hydrocarbons, i.e., cracking, isomerization, disproportionation, and the like in the presence of an acidic, refractory solid oxide catalyst having unique activity at relatively low conversion temperatures while in the presence of a relatively small amount of an activator substance.

This invention further contemplates a process for regulating the activity and product selectivity of a solid oxide catalyst for the low temperature conversion of hydrocarbons by regulating the amount of activator substances that is mixed with the hydrocarbon charge or added separately before the charge is subjected to conversion conditions.

In accordance with this invention, it has been found that the high activity of certain refractory solid oxide catalysts for effecting the conversion of certain hydrocarbons can be uniquely controlled and further enhanced by providing a preselected amount of an activator substance as a minor additive to the hydrocarbon charge stream that is being reacted.

The process of this invention is applicable to many hydrocarbon conversion systems. In general, any conversion reaction that usually employs acidic catalysts and is thermodynamically feasible at low temperature conditions in which the reaction of the hydrocarbon charge as such does not involve unsaturated carbon bonds can be promoted by this invention. Exemplary of some of the conversion systems that are contemplated by this invention are the isomerization of saturated hydrocarbons, the low temperature cracking of saturated hydrocarbons, and the disproportionation and isomerization of aromatic hydrocarbons. In general, the saturated hydrocarbons include those containing from about four to about 15 carbon atoms. Typical examples of such hydrocarbons are n-butane, isobutane, cyclobutane, n-pentane, dimethyl ethylmethane, tetramethyl methane, cyclopentane, n-hexane, 2-methylpentane, 3-methylpentane, 2,2-dimethylbutane, 2,3-dimethylbutane, cyclohexane, n-heptane, 2-methylhexane, 3-methylhexane, 2,2-dimethylpentane, 2,3-dimethylpentane, 2,4-trimethylbutane, 3,3-dimethylpentane, 3-ethylpentane, 2,2,3-trimethylbutane, cycloheptane, n-octane, 2-methylheptane, 2,3-dimethylhexane, n-dodecane and the like. The aromatic hydrocarbons that may serve as the hydrocarbon charge can be those in the benzene, naphthalene, anthracene and the like series and are represented by toluene, o-xylene, p-xylene, m-xylene, 1,2,3,4-tetramethylbenzene, 1,2,4,5-tetramethylbenzene, pentamethylbenzene, ethylbenzene, n-butylbenzene, β-methyl naphthalene, β-ethyl naphthalene, 1,3-dimethyl anthracene and the like.

Particularly effective solid oxide catalysts for the purposes of this invention include a variety of crystalline alumino-silicates having an ordered internal structure which can be either naturally occurring or synthetically produced. These catalysts contain active sites that are formed by the presence of metal cations and/or hydrogen ions bonded within the ordered internal structure of the alumino-silicate; preferably the alumino-silicates contain a substantial portion of hydrogen sites within an ordered internal structure.

The very active alumino-silicate catalysts are generally prepared from alkali metal forms by base exchange with certain polyvalent metal cations and/or hydrogen ions and/or ammonium ions so as to at least partially replace the alkali metal cations. After being base exchanged the exchanged alumino-silicates having a system of internal pores, passages, or cavities within an ordered internal structure are activated by being dried and calcined.

The alumino-silicates employed as catalysts may be forms of the synthetic and/or naturally occurring crystalline alumino-silicates, including zeolite A and the faujasites, such as zeolites X and Y, and others as are hereinafter described in greater detail.

In general, the solid oxide catalysts used in this invention are characterized by remarkably high levels of activity at relatively low conversion temperatures and are further activated by the use of an activator substance.

In contrast, it has been found that other conventional solid oxide catalysts such as acid-treated clays, e.g. fuller's earths, vermiculites, attapulgites, kaolinites, ittites, montmorillonites, bentonites, and the like; heterpolyacid gels e.g., silica-alumina, silica-magnesia, silica-titania, and the like; and phosphated zirconia gels, and the like are inactive at such low conversion temperatures with or without the addition of an activator substance.

Advantageously, several substances can be used as the activator substances of this invention. Particularly effective activators include olefins, e.g., ethylene, propylene, butene-1, butene-2, isobutylene, pentene-1, hexene-1, heptene-1, octene-1, and the like; diolefins e.g., propadiene, 1,3-butadiene, 1,4-pentadiene, isoprene, diallyl, 1,4-octadiene, and the like; such materials which will at least partially convert to olefins such as alkyl halides, e.g., ethyl bromide, 2-propyl chloride, 2-butyl bromide, 2-butyl chloride, 3-butyl iodide, 3-pentyl bromide, 2-hexyl chloride, alcohols such as ethanol, propanol, iso-butanol, and the like. Also, it will be appreciated that other organic substances capable of forming olefins, diolefins or alkyl halides by reaction or decomposition in the hydrocarbon charge stream may be used as activators.

In addition, other substances have been found that can also serve as activators. Thus, in the conversion of low molecular weight hydrocarbons higher molecular weight paraffinic hydrocarbons containing from about eight to about 30 carbon atoms are effective co-catalysts. Of these hydrocarbons, those which contain tertiary carbon atoms or quaternary carbon atoms are the most preferred (e.g., 2,2,4-trimethylpentane). Still other substances that can be employed as activators include oxygen and other oxidizing materials, e.g., peroxides, which are believed to, in turn, convert substances of the charge stock olefinic activator species.

In accordance with this invention the concentration of activator substances within the hydrocarbon charge stream is regulated to enhance the product selectivity and/or activity of the solid oxide catalyst for intended hydrocarbon conversions. Thus, it has been found that the concentrations of activators necessary for effecting the desired results are from about .01 to about 5 mole percent of the hydrocarbon charge, with a preference for a range of from about .05 to .5 mole precent. It will be appreciated that the amount of activator required, depends on the intended conversion, on the hydrocarbon charge, on the nature of the solid oxide catalyst, and on conditions of operation.

One particularly effective method for regulating the amount of activator substance within a hydrocarbon stream consists of passing at least part of the hydrocarbon stream through a catalytic hydrogenation zone which produces a low or near zero "quiescent" level of activation, regardless of otherwise occurring changes in the nature of the charge-stock. This operation is followed by injecting a measured amount of activator substance into the resulting hydrocarbon stream before passing the stream into a conversion zone containing a superactive solid oxide catalyst, thus allowing for a controlled concentration of activator substance in the stream. Advantageously, catalytic hydrogenation can be affected with certain catalysts and under appropriate conditions which produce the hydrogenative conversion of a very small amount—often nearly immeasurable—of the hydrocarbons which may constitute the "noise" level of variable or undesirable influence in the catalyst.

Another method for adding or controlling the amount of activator substance involves shifting the paraffin-olefin equilibrium in a hydrocarbon charge stream. In general, this method consists of passing a charge stream containing saturated hydrocarbons through a catalytic hydrogenation-dehydrogenation zone containing an appropriate catalyst, and subsequently passing the resulting effluent stream to a catalytic conversion zone containing a superactive solid oxide catalyst, in a manner similar to the method defined above for attaining a quiescent state. However, by properly controlling the operating conditions in the hydrogeneration-dehydrogenation zone, the amount of olefinic activators in the charge stream can thus also be increased to enhance the intended conversions over the solid oxide catalysts. The hydrogenation-dehydrogenation equilibrium and the conversion activity of the zone can be effectively controlled by the choice of temperature and/or hydrogen partial pressure in said zone. It is shifted toward greater catalytic activities by either a higher temperature or lower hydrogen partial pressure, or both, in the preceding hydrogenation-dehydrogenation zone. Usually the total pressure of this operation will be near atmospheric, and the temperature will be between about room temperature and about 800° F. and preferably between about 200° F. and 650° F. Usually hydrogen partial pressure will be maintained at a fraction of an atmosphere. It is possible, however, to operate at superatmospheric pressure, and this will be particularly convenient when the subsequent catalytic reactor is operated at such superatmospheric presure. Usually, the desired shift in paraffin-olefin equilibrium is effected at elevated temperatures over a catalyst of a platinum metal-type. However, other catalysts having hydrogenation activity can be employed, as for example, nickel, cobalt, tungsten, molybdenum, and other transition metals and compounds thereof. The pre-conversion zone may be employed to cause a net increase in the level of olefinic unsaturation in the charge; or, where the charge contains too high an amount of such activators initially, the pre-conversion zone is used to partially saturate them, in each case by proper choice of temperature and pressure conditions therein.

It is believed that the activator substances improve the conversion activity of the solid oxide catalysts through a chainlike reaction mechanism. Apparently, the activators react on the solid catalyst to form chain activator ions or compounds. Subsequently, the activators, which may be considered as fluid co-catalysts, react with the hydrocarbons to form more stable products, with the product distribution depending on the catalyst, on the hydrocarbon charge, and on the operating conditions in the conversion zone.

As heretofore described, the solid oxide catalysts of this invention exhibit high levels of catalytic activity at low conversion temperatures. Generally, the superactive solid oxide catalysts are characterized by having alpha values greater than 500, where alpha ($\alpha$) is the comparative activity of the super-active catalyst based upon conventional amorphous silica-alumina cracking catalyst of an activity index of 46, as determined by the "Cat. A" test with an alpha value of near 1. (A test method for determining the alpha value of a catalyst is hereinafter described in great detail.)

In addition, the superactive solid oxide catalysts are characterized by the capability to accomplish effective catalytic conversions at temperatures below about 650° F. and preferably at or below 500° F.

Advantageously, it has also been found that pretreatment of the superactive alumino-silicate catalysts, particularly acid mordenite and the like, with a gaseous atmosphere such as oxygen or hydrogen at temperatures of about 1000° F. also enhances the product selectivity of the catalysts with or without the use of a fluid co-catalyst. For example, hydrogen or oxygen pretreatment of an acid mordenite catalyst causes it to exhibit greater selectivity for the isomerization of saturated hydrocarbons. It is believed that the oxidation-reduction state of metallic impurities in the superactive catalyst may promote generation or removal of chain activators in the hydrocarbon stream.

The processes of this invention can be operated over a wide range of appropriate temperatures and pressures suitable for the intended conversions. In general, the operating temperatures in the conversion process, particularly during the isomerization and/or cracking of hydrocarbons, will be below about 650° F. Preferably, conversions are conducted at a range of from about 250° F. to about 500° F. It will be understood that the choice of specific reaction temperature will be governed by the conversion desired, by the amount and nature of activator being employed, and by the relative activity of the solid oxide catalyst.

The pressures employed by the conversion processes of this invention may extend from about atmospheric to superatmospheric pressures. Often, the process is conducted at atmospheric pressure.

The amount of solid oxide catalysts used to effect the conversion reactions of this invention may vary considerably depending upon the relative activity of the solid catalysts as well as the amount of activators employed to promote a desired reaction. In addition, the nature of process, that is, whether it is a batch-type, a continuous, or a semicontinuous process is to be considered in determining the amount of solid catalysts necessary for a specific reaction. It will be appreciated that it is one of the advantages of refractory and insoluble solid oxide catalysts that they are readily regenerated during cyclic continuous processes or when so used in batch-type operations, by burning off coke-like contaminants in an air stream at temperatures of from about 800° F. to about 1400° F., and that they are permanently located in the reaction zone with no losses by solubility or evaporation.

Carrier gases such as hydrogen, helium, nitrogen, steam or others, may be employed to introduce the hydrocarbon charge or the activator substances into the reactor vessels. Often, hydrogen is used, since choice of hydrogen partial pressure is needed for controlling the production or removal of the olefinic impurities in the catalytic hydrogenation zone, when such is employed.

In accordance with this invention many alumino-silicates can be employed as catalysts. Thus, some crystalline alumino-silicates can be base exchanged directly with hydrogen ions to form products which have an acid character and which are suitable for use as catalysts. Other alumino-silicates such as zeolite X, a synthetic faujasite, are either not suitable for direct base exchange with hydrogen ions, or are not structurally or thermally stable after a portion of their exchangable metal cations have been replaced with hydrogen ions. Thus, it is often necessary to exchange other metal cations with these alumino-silicates in order to achieve the necessary stability within the ordered internal structure to achieve stable structures which include hydrogen sites. In effecting such stability, it has been found that base exchange of certain polyvalent metal cations (such as those of the rare earth metals), not only provides stability to the alumino-silicate, but also increases the concentration of hydrogen sites without use of direct base exchange with hydrogen ions, as described. Apparently, the bonding of multi-valent metal cations, particularly those previously noted, within certain alumino-silicates, causes the formation of hydrogen sites within their ordered internal structures. It is believed that such metals, especially those which have valences of three or more, produce hydrogen sites within the alumino-silicate because of the spatial arrangement of the $AlO_4$ and $SiO_4$ tetrahedra which make up the ordered internal structure of the alumino-silicate.

The concentration of hydrogen sites created by these metals can be further increased by subsequent or simultaneous base exchange with hydrogen ions or cations which are capable of being converted to hydrogen ions; e.g., the ammonium radical ($NH_4^+$).

It has been found that alumino-silicates having a high silicon to aluminum atomic ratio are particularly desirable as catalysts for purposes of this invention. A ratio of silicon to aluminum atoms of at least about 1.8 to 1 is preferred and a ratio of 2.8 to 1 or greater is particularly preferred. Such crystalline alumino-silicates are readily converted to forms of superactive catalysts by contacting with solutions which contain hydrogen ions or with a species of ions convertible to hydrogen ions, such as ammonium. High alpha activity catalysts useful in this invention are thereby produced following thorough drying of the base exchanged hydrogen alumino-silicates, or drying and calcination of ammonium alumino-silicates.

It will also be appreciated that the concentration of the hydrogen sites, produced either by direct exchange of hydrogen ions or by exchange of polyvalent metal cations within certain alumino-silicates, as described above, may very according to the cations employed, the degree of base exchange, as well as the alumino-silicate being treated. Accordingly, it has been determined that the alumino-silicates having at least 0.5 milliequivalent of hydrogen per gram of solid and preferably above about 0.75 milliequivalent of hydrogen per gram of solid are effective catalysts for purposes of this invention. It will be understood that this value indicates the total concentration of hydrogen present within the superactive alumino-silicate catalyst.

Because the unique method of controlling or modifying the alumino-silicate catalyst for effecting the reactions of the present invention is dependent not only on the presence of the heretofore described co-catalysts, but also on the accessibility of active cation sites therein, the pore size of the alumino-silicate is to be considered. In general, the alumino-silicate should have a pore size of such dimensions that it can accept the reactants of this invention within its order internal structure and allow egress of the product. In general, the pore size is from at least about 4° A. and preferably about 5° A. to about 15° A. in diameter. It will be appreciated that the selection of the alumino-silicate catalyst, to be used in a specific application, will depend upon the reactants and also the reaction products.

Typical of the alumino-silicates employed in accordance with this invention, are several alumino-silicates, both natural and synthetic, which have a defined pore size of about from 5° A. to about 15° A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$\frac{M_2}{n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented by the above formula, with $w=2.5\pm0.5$, and $y$ depending on the state of hydration. Zeolite X is best known and commercially available in the sodium form.

It will be appreciated that the crystalline structure of zeolite X is different from most zeolites in that it can absorb molecules with molecular diameters up to about 13° A.; such molecules including branched chain hydrocarbons, cyclic hydrocarbons, and some alkylated cyclic hydrocarbons.

Many alumino-silicates are contemplated as also being effective catalytic materials for the invention. Of these other alumino-silicates, a synthetic faujasite designated as zeolite Y, having the same crystalline structure as zeolite X, but having a greater silica to alumina ratio is also useful. Due to its higher silica content this zeolite, in some of its forms, has more stability to the hydrogen ion than zeolite X.

The selectivity of zeolite Y for larger molecules is appreciably the same as zeolite X because its pore size extends from 10° A. to 13° A.

Other alumino-silicate materials found to be active in the present process include as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

$$Na_8(AlO_2)_8(SiO_2)_{40} \cdot 24H_2O$$

Mordenite has an ordered crystalline structure made up of chains of 5-membered rings of tetrahedra. In its sodium form the crystal is believed to have a system of parallel channels having free diameters of about 4.0° A. to about 4.5° A., interconnected by smaller channels, parallel to another axis, on the order of 2.8° A. free diameters. Advantageously, in certain ionic forms, e.g. acid exchanged, the mordenite crystal can have channels with effective free diameters of from about 6.5° A. to about 8.1° A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, heulandite, clinoptilolite, stilbite, chabazite, gmelinite, offretite, erionite, mordenite and mordenite-like structures, and dachiardite.

One of the suitable alumino-silicate catalysts is prepared from the sodium form of zeolite X having a pore size of about 13 A. This alumino-silicate is a commercially available zeolite designated as Linde "13X." The catalyst can be prepared by conventional base exchanging involving partial or complete replacement of the sodium of zeolite X by contact with a fluid medium containing cations of one of the rare earth metals. Any medium which will effect ionization without affecting the crystalline structure of the zeolite can be employed. After such treatment, the resulting exchanged zeolite product is water washed, dried and dehydrated. The dehydration, as heretofore described, produces the characteristic system of open pores, passages, or cavities of the crystalline alumino-silicates.

As a result of the above treatment, the rare earth exchanged alumino-silicate is an activated crystalline catalyst material containing rare earth and hydrogen sorbed or ionically bonded thereto. Because specific rare earth metal cations as well as a mixture of several different rare earth metal cations can be base exchanged with the alumino-silicate, the concentration of hydrogen sites produced within the catalyst can vary depending on the completeness of the exchange as well as the rare earth cations employed. Thus, it has been found that the rare earth exchanged zeolite X catalyst can contain from about 0.5 to about 1.0 milliequivalent of hydrogen per gram of solid catalyst. Examples of and methods for preparation of active alumino-silicate catalysts are further illustrated in U.S. Patent 3,140,252. It is to be noted that the catalysts of this invention shall have very acid catalytic activity, such as at least 500 and preferably at least 2000 times the activity of conventional amorphous silica-alumina catalyst, that is, alpha values of greater than 500, or greater than 2000 respectively. Such activities will be referred to as "superactivities" for the purposes of describing this invention. These activities are attained by methods which include the methods described in U.S. Patent 3,140,252, particularly when severe steam treating is excluded from the finishing or calcining operation.

It will be understood that the Si/Al atomic ratio of the alumino-silicates greatly influences their physical stability which in turn determines whether higher alpha values ($\alpha$) can be obtained by base exchange with ammonium and/or hydrogen ion exchange. In particular it has been found that ammonium ion exchange can be used to produce superactive catalysts only from those alumino-silicates that have a Si/Al atomic ratio of at least about 1.8. Also when exchange with mineral acids is employed to produce very high alpha activity, the Si/Al atomic ratio should be at least about 2.8. It will be appreciated that the above designated critical limits of the Si/Al atomic ratio are distinct critical limits.

Mordenite can be activated to serve as a catalyst for the instant invention by replacement of the sodium ion with a hydrogen ion. Mordenite can be activated by ion exchange with ammonium followed by drying and calcination. It may also be treated with a mineral acid such as HCl used as a source of hydrogen ion. In general, the mordenite is reduced to a fine powder (approximately passing a 200 mesh sieve and preferably passing 300 and 325 mesh sieves or finer) and then acid treated.

It will be appreciated that cations of metals other than the rare earths having mono- and polyvalences can be employed to replace the exchangeable cations from the alumino-silicates to provide effective catalysts for this invention. Exemplary of these metals are zinc, magnesium, tin, silver, and the like. Moreover, other higher valence metals such as zirconium, titanium, vanadium, tungsten, and the like can also be employed. It will be appreciated that certain divalent metals such as calcium, barium, and magnesium can be used with ammonium chloride or like ammonium compounds to produce active cation sites within the alumino-silicate catalyst by conventional base exchange techniques, the ammonium ion being decomposed to form hydrogen sites by heating the exchanged alumino-silicate to drive off ammonia.

In order to evaluate the superactive solid oxide catalysts, a test method has been developed to measure their catalytic activity.

In conducting the test, n-hexane is fed to a reactor which contains a catalyst to be evaluated. The flow rate of the n-hexane, catalyst sample size and temperature in the reactor are preselected to obtain conversion levels in the range of 5 to 50 weight percent. Normally, an amount of catalyst of about 0.5 to 2.0 cc. is placed in the reactor, and helium, saturated at room temperature with n-hexane vapor is passed over the catalyst at a flow-rate of 10 cc./minute. The product stream is sampled at a given time on stream, such as at 5 or 10 minutes from commencement of reaction.

The conversion of n-hexane is determined by gas liquid chromotography of the effluent sample. The findings are converted to a reaction rate constant per unit volume of catalyst by the assumption of a first order or pseudo-first order reaction. This value is then corrected to 1000° F. by the use of an Arrhenious plot, if the evaluation occurred at some other temperature. Results are therefore reported as comparative activity constants at 1000° F. More than one trial may be necessary in selecting the reaction temperature until conversion is in the above-noted desirable range. The value obtained is normalized for the catalyst in question and then compared with that typical of a conventional cracking catalyst by dividing it by the reaction rate constant for a conventional silica-alumina catalyst containing about 10 weight percent alumina and having a "Cat.-A" activity of about 46 as described in National Petroleum News 36, page P.R.-537 (August 2, 1944). Such catalyst is hereinafter designated as 46AI silica-alumina-catalyst.

This procedure corresponds to comparing the catalyst being tested with a conventional amorphous silica-alumina reference catalyst of 46AI (CAT-A) assigned an alpha value of 1. This latter catalyst will give in the alpha test method, 13.0 percent conversion of n-hexane, at 1000° F., using 1.5 cc of catalyst, 30 to 60 mesh, exposed to reactant at a gaseous flow rate of 10 cc. per minute of helium saturated with vapors of n-hexane at room temperature and pressure, instantaneous conversion being measured at the fifth minute of on-stream time.

The following table will illustrate ranges and magnitudes of relative catalytic cracking activity which have been achieved, by way of some examples. It will be seen that these activities span a range of about four orders of magnitude. Catalysts of the present invention, capable of further activation, modification, and influence by the fluid co-catalysts are characteristically those having a "superactivity" within this scale, of at least about $\alpha=500$, and more preferably at least about $\alpha=2000$.

TABLE 1

Conventional SiAl cracking catalyst
  from commercial operation _____ $\alpha \approx 0.2$ to 0.6.
Conventional SiAl beads
  untempered, fresh _____ $\alpha \approx 1.0$.
Silica-magnesia,
  experimental _____ $\alpha \approx 0.5$ to 2.0.
Sodium faujasite _____ $\alpha \approx 0.5$ to 1.0.
Fresh rare earth exchanged
  faujasite (depending on sodium
  content) _____ $\alpha \approx 10$ to 10,000.
Acid mordenite _____ $\alpha \approx 10,000$ to 20,000.
Acid Y faujasite _____ $\alpha \approx 10,000$.
Steam-treated acid or rare earth
  faujasites (depending on steam
  severity) _____ $\alpha \approx 10$ to 500.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous absorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate.

It will be appreciated that the operating conditions employed by the present process will be dependent upon the specific conversion reaction being effected. This invention can be more readily understood by reference to the following specific examples.

The conversion reactions of the following illustrative examples were carried out in a conventional micro reactor containing the solid oxide catalyst at a controlled and specified temperature. When using a normally liquid hydrocarbon, a continuous stream of hydrogen or helium saturated with hydrocarbons at about 70° F. is passed through the reactor at a gas velocity of 10 cc. per minute so that the residence time is about 6 seconds for a catalyst sample of 1 cc. volume. All runs are conducted at atmospheric pressure.

In several runs, the hydrocarbon charge stock is passed through a tubular reactor placed ahead of and in series with the conversion reactor so that the hydrocarbon charge is subjected to various hydrogenation-dehydrogenation conditions before entering the conversion reactor. The tubulor reactor contains a catalyst of platinum metal on an alumina support.

After the catalysts have been raised to reaction temperature in the reactors, the reactants are passed over the catalyst for extended period of operation.

Samples of the product stream are periodically removed, and analyzed by vapor phase chromotography.

*Example I*

A reactor was loaded with one milliliter of an acid exchanged mordenite catalyst and treated with air at 1000° F. for 15 minutes.

Then a stream of n-butane in hydrogen was passed through the reactor at a temperature of 450° F. and a sample of the products were analyzed after five minutes on stream. The results of this run are shown below.

TABLE 2

Conversion of n-butane [1] over acid mordenite at 450° F.

Isomerization conversion weight percent _____ 25.0
Cracking conversion weight percent _____ 14.7
Production of $C_5+$ products, weight percent _____ 5.0
Isomerization selectivity, percent _____ 56

[1] Analysis of this gas showed that it contained a measurable amount of butene

*Example II*

In this example, two micro reactors were placed in series. The first reactor contained a catalyst of platinum metal on an alumina support and the second reactor contained an acid mordenite catalyst pretreated with air at 1000° F. Several runs were conducted in which a stream of n-butane (with a measurable amount of butene) in a hydrogen carrier gas was passed through the two reactors. During this series of runs the temperature of the platinum catalyst was raied stepwise from about 450° F. to about 900° F. As shown in the following table, shift in the butane-butene equilibrium over the platinum catalyst at elevated temperature greatly enhances the activity of the acid mordenite catalyst for isomerization reactions. (The data obtained in Example I have been included in Table 3 to facilitate comparison of the selectivity of the catalyst for isomerization of hydrocarbons.)

TABLE 3

| Run No. | Pt-bed (Reactor I), temp. °F. | H-Mordenite (Reactor II), temp. °F. | Conversion, wt. percent | |
|---|---|---|---|---|
| | | | (iC$_4$) | (C$_1$ to C$_3$) |
| 1 | None | 450 | 25.0 | 14.7 |
| 2 | 450 | 450 | 10.4 | 4.1 |
| 3 | 615 | 450 | 13.4 | 9.3 |
| 4 | 700 | 450 | 18.0 | 20.1 |
| 5 | 800 | 450 | 12.4 | 35.0 |
| 6 | 900 | 450 | 6.8 | 61.3 |

The above data shows that when the temperatures of the platinum catalyst are raised to promote olefin production in the paraffin charge, the selectively for isomerization is initially greater than that for cracking (in Run 2 the selectivity for isomerization is greater than Run 1). Furthermore, the activity of the catalyst for isomerization and cracking becomes greater with increased platinum catalyst temperature; with the cracking activity being profoundly accelerated (from an initial 14.7 weight percent to 61.3 weight percent conversion to cracked products).

*Example III*

A butane-hydrogen stream is passed through a reactor containing a bed of platinum on alumina at 400° F. and the resulting effluent stream is then passed through a second reactor containing a one milliliter bed of cerium-hydrogen exchanged zeolite X at 500° F. After measuring activity of the zeolite X catalyst in terms of isomerization and cracking of the n-butane for one hour, the catalyst is regenerated and the flow of butane-hydrogen continued with injection of 0.7 ml. per minute of 1.8% butene in hydrogen into the purified butane stream. The results of these runs are shown below.

TABLE 4

| Feed rate (ml./min.) | | | Time on stream (min.) | Products, wt. percent | |
|---|---|---|---|---|---|
| (H$_2$) | (nC$_4$) | (H$_2$+C$_4$=) | | (iC$_4$) | (C$_1$–C$_3$) |
| 8 | 2 | -------- | 10–61 | 0.1 | 0.1 |
| ([1]) | ([1]) | ([1]) | ([1]) | ([1]) | ([1]) |
| 8 | 2 | 0.7 | 11–30 | 1.5 | 0.4 |
| 8 | 2 | 0.7 | 50–105 | 1.9 | 0.6 |

[1] Regeneration.

Examination of the above data further shows that the use of activator substances substantially enhances the activity of solid oxide catalysts, such as the superactive alumino-silicates, for the low temperature conversion of hydrocarbons. Moreover as exemplified by Example II the amount of activator can be regulated over substantial ranges to control the activity and product selectivity of the solid catalysts.

*Examples IV to XI*

In the following examples, the effectiveness of a number of activator substances, in combination with a superactive crystalline alumino-silicate is illustrated. In these examples, the superactive catalyst, a one milliliter sample of acid mordenite, was placed in the second reactor of a two reactor combination as described in Example III. Both reactors were operated at a constant temperature of 450° F. Various activator substances were introduced, that is added, into the pre-purified stream, between the first and second reactor.

In this case the acid mordenite sample was initially treated for 15 minutes in hydrogen at 1000° F. With such pretreatment of the catalyst, and with the hydrogenative pretreating of the n-butane charge in the first reactor, the "quiescent" state of conversion for n-butane produced in the second reactor is zero percent (Example IV), and as such affords a base condition for ready demonstration of the effect of the activators added to the pre-purified stream. The results of these examples are shown below in tabular form.

TABLE 5

| Example | Activator | | On-stream time, mins. | Conversion, percent to— | |
|---|---|---|---|---|---|
| | Compound | Conc., mole percent of n-butane | | (iC$_4$) | (C$_1$ to C$_3$) |
| IV | None | | Any | 0 | 0 |
| V | Cis-2-butene | .8 | 40 | 14.4 | 2.6 |
| VI | Iso-butene | .5 | 40 | 8.3 | 2.4 |
| VII | Octene-1 | .5 | 40 | 10.2 | 3.2 |
| VIII | do | .1 | 20 | 12.6 | 4.8 |
| | | | 40 | 8.2 | 2.8 |
| IX | do | .03 | 20 | 9.3 | 3.1 |
| | | | 40 | 6.8 | 2.5 |
| | | | 5 | 2.6 | .8 |
| X | 2-butylbromide | .25 | 60 | 8.0 | 1.7 |
| | | | 120 | 8.3 | 1.7 |
| XI | 2,2,4 trimethyl-pentane | 25 | 5 | 3.8 | 1.4 |
| | | | 40 | 14.4 | 2.6 |

Examination of the above data shows that the presence of activator substances in small amounts greatly improves the isomerization and cracking activities of superactive alumino-silicate catalysts for the conversion of unsaturated hydrocarbons.

What is claimed is:

1. A process for isomerizing and cracking hydrocarbons which comprises passing a hydrocarbon charge comprising a paraffinic hydrocarbon containing from 4 to 15 carbon atoms in contact with superactive alumino-silicate catalyst having an activity constant of at least 500α in a reaction zone maintained under conversion conditions at a temperature below 650° F., introducing and maintaining an activator substance in a concentration of from about .01 to 5 mole percent of the paraffinic hydrocarbon in said reaction zone during conversion to enhance the activity of the catalyst; said activator substance being selected from the group consisting of olefins, diolefins, alkylhalides, branched paraffinic hydrocarbons containing more carbon atoms than that of the paraffinic hydrocarbons in said hydrocarbon charge and compounds which form olefins under the conversion conditions.

2. The process of claim 1 in which the alumino-silicate catalyst has a silicon to aluminum atomic ratio of at least about 1.8.

3. The process of claim 1 in which the alumino-silicate catalyst has a silicon to aluminum atomic ratio of at least about 2.8.

4. The process of claim 1 in which the alumino-silicate catalyst contains cations of the rare earth metals.

5. The process of claim 1 in which the alumino-silicate catalyst is a rare earth exchanged faujasite.

6. The process of claim 1 in which the alumino-silicate catalyst is a cerium-hydrogen exchanged faujasite.

7. The process of claim 1 in which the alumino-silicate catalyst is hydrogen exchanged zeolite Y.

8. The process of claim 1 in which the alumino-silicate catalyst is acid mordenite.

9. The process of claim 1 in which the alumino-silicate catalyst is admixed with a material of lesser activity.

10. The process of claim 1 in which the alumino-silicate catalyst is pretreated with air to 1000° F. for about 15 minutes.

11. The process of claim 1 in which the alumino-silicate catalyst is pretreated with hydrogen at 1000° F. for about 15 minutes.

12. The process of claim 1 in which the activator substance is butene-1.

13. The process of claim 1 in which the activator substance is cis-2-butene.

14. The process of claim 1 in which the activator substance is iso-butene.

15. The process of claim 1 in which the activator substance is octene-1.

16. The process of claim 1 in which the activator substance is 2-butyl-bromide.

17. The process of claim 1 in which the activator substance is 2,2,4-trimethylpentane.

18. The process of claim 1 in which the hydrocarbon charge comprises n-butane.

19. A process for isomerizing and cracking hydrocarbons which comprises passing a hydrocarbon charge comprising a paraffinic hydrocarbon containing from 4 to 15 carbon atoms into a catalytic hydrogenation-dehydrogenation zone under conversion conditions that produce and maintain an olefin in a concentration of from about .01 to 5 mole percent of the paraffinic hydrocarbon and thereafter passing the resulting effluent stream in contact with a superactive alumino-silicate catalyst having an activity constant of at least 500α in a reaction zone maintained under conversion conditions at a temperature below about 650° F., said olefin enhancing the activity of said superactive catalyst during conversion of said paraffinic hydrocarbon.

20. A process for isomerizing and cracking hydrocarbons which comprises passing a hydrocarbon charge comprising a paraffinic hydrocarbon containing from 4 to 15 carbon atoms into a catalytic hydrogenation-dehydrogenation zone under conversion conditions that alter the concentration of an olefin in said hydrocarbon charge, thereafter introducing an activator substance to mix with the resulting effluent stream to produce a final concentration of activator substance of from .01 to 5 mole percent of the paraffinic hydrocarbon and thereafter passing the mixed effluent stream in contact with a superactive alumino-silicate catalyst having an activity constant of at least 500α in a reaction zone maintained under conversion conditions at a temperature below about 650° F.; said activator substance enhancing the activity of said superactive catalyst and being selected from the group consisting of olefins, diolefins, alkylhalides, branched paraffinic hydrocarbons containing more carbon atoms than that of the paraffinic hydrocarbon in said hydrocarbon charge and compounds which form olefins under the subsequent conversion conditions.

References Cited by the Examiner

UNITED STATES PATENTS

| 2,971,903 | 2/1961 | Kimberlin et al. | 208—46 |
| 3,033,778 | 5/1962 | Frilette | 208—46 |
| 3,039,953 | 6/1962 | Eng | 208—46 |
| 3,114,696 | 12/1963 | Weisz | 208—46 |
| 3,140,253 | 7/1964 | Plank et al. | 260—683.65 |
| 3,190,939 | 6/1965 | Benesi | 260—683.65 |

DELBERT E. GANTZ, *Primary Examiner.*

R. H. SHUBERT, *Examiner.*

UNITED STATES PATENT OFFICE
CERTIFICATE OF CORRECTION

October 18, 1966

Patent No. 3,280,212

Joseph N. Miale et al.

It is hereby certified that error appears in the above numbered patent requiring correction and that the said Letters Patent should read as corrected below.

Column 11, line 64, for "with air to 1000° F." read -- with air at 1000° F. --.

Signed and sealed this 5th day of September 1967.

(SEAL)

Attest:

ERNEST W. SWIDER

Attesting Officer

EDWARD J. BRENNER

Commissioner of Patents